United States Patent Office 3,492,262
Patented Jan. 27, 1970

3,492,262
FRICTION ELEMENTS
Arvon M. Griffith, Valley Cottage, N.Y., assignor to Abex Corporation, New York, N.Y., a corporation of Delaware
No Drawing. Continuation-in-part of application Ser. No. 313,754, Oct. 4, 1963. This application Sept. 7, 1966, Ser. No. 577,612
Int. Cl. B61h *1/00;* F16d *69/02;* C08g *51/08*
U.S. Cl. 260—38                  2 Claims

ABSTRACT OF THE DISCLOSURE

A railroad brake shoe composition is provided comprising a thermosetting phenolic resin matrix and a mixture of filler materials of cast iron particles, graphite particles, and asbestos fibers.

---

This application is a continuation-in-part of my application Ser. No. 313,754, filed Oct. 4, 1963, now abandoned.

This invention relates to friction elements and in particular to railroad brake shoes of the so-called composition type, containing an organic ingredient, as distinguished from the conventional or standard shoe consisting of cast iron.

The conventional or standard railroad brake shoe is one of cast iron, and the usual arrangement is to have two such shoes respectively secured to brake heads located on opposite sides of the railroad car wheel in what is commonly known as a clasp brake arrangement. Railroad brake shoes of this character have proven to be eminently satisfactory since their inception many years ago, but in recent years, and with particular regard to a limited purpose of reducing the requirements of the brake equipment considered as a whole, it has been proposed to resort to so-called composition shoes which are known to display a higher coefficient of friction than the cast iron shoe. Such composition shoes are characterized by inorganic filler bodies supported by an organic binder matrix.

As noted above, the cast iron shoe is the accepted standard in the industry. There are several reasons for the dominant position of the cast iron shoe including its durability and ease in fabrication, but perhaps the most notable attribute of the standard cast iron shoe is the fact that it displays substantially the same uniformity of friction under wet conditions as under dry conditions. The undesired opposite, or contradictory condition is known as "wet fade-out."

It will be appreciated that railroad brake shoes are frequently replaced, necessitated of course by the extent of attrition encountered in the normal use of the shoe. Thus, the railroads are particularly conscious of taking every precaution to avoid accidents, and frequent inspections of the shoes on the cars are made in order to detect an unduly worn shoe that should be replaced. Consistent with their attitude toward safety, the railroads have insisted upon the establishment of precautionary measures to prevent the inadvertent replacement of a cast iron shoe by a composition shoe. This precaution is necessary, at present, because one of the most pronounced characteristics of composition shoes is a significantly higher coefficient of friction in comparison to shoes of the cast iron type as noted above. Since cast iron shoes are, by and large, the more common form, the brake pressures and associated brake structure are designed for the most part for the relatively low frictional value of the cast iron shoe. As a consequence, most railroad brake equipment is designed to apply to a cast iron shoe a greater braking force than would be required for a composition shoe. Resultantly, any attempt to interchange a cast iron shoe and composition shoe is fraught with danger, and this must be guarded against. Nevertheless, there exists the hazardous probability of a wrong substitution, and in order to minimize this probability an object of the present invention is to produce a composition shoe having approximately the same coefficient of friction as a cast iron shoe, and one which does not display wet fade-out to any unacceptable degree, whereby it can be expected that a given brake pressure under operating conditions will be equally effective on a composition shoe and a cast iron shoe, other conditions being equal.

Another advantage to achieving low friction in a composition shoe is that the higher braking force required, comparable to the braking force required for a cast iron shoe, will result in accumulations of ice and snow on the face of the shoe being eliminated more quickly when the shoe is engaged with the tread of the car wheel, in comparison to a composition shoe of high friction being held against the car wheel with a correspondingly low brake pressure. This is of particular importance to operations in those geographical areas where inclement winter weather is encountered.

Other and further objects of the present invention will be apparent from the following description and claims which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

The friction element of the present invention is characterized by a binder or matrix that consists of a straight phenol formaldehyde resin as a preferred thermosetting resin matrix, and distributed therethrough are filler particles consisting of iron, graphite and asbestos. It is found that this compisition is responsible for achieving relatively low friction in a composition railroad brake shoe, that is, a friction coefficient of approximately 0.20 corresponding to that of the standard cast iron shoe. Further, the friction of the shoe when wet has been found to drop off to about 0.19 only, manifesting very little expectancy in undesirable wet fade-out. Having achieved this, it is possible to interchange the railroad brake shoe of the present invention in railroad brake equipment that normally accepts a cast iron shoe without apprehension of creating a dangerous condition.

The following example represents a preferred form of the present invention:

EXAMPLE 1

| Ingredient | Percent by weight |
|---|---|
| Powdered phenol formaldehyde (binder) | 15 |
| Cast iron particles (—40 mesh) | 25 |
| Natural graphite (40–45 micron) | 43.5 |
| Asbestos fibers | 16.5 |

The ingredients of Example 1 are dry blended to a homogeneous state whereafter a mold corresponding to the geometry of the composition friction element, as for example a railroad brake shoe, is filled therewith and closed off prior to subjecting the mixture to a preliminary cure for two to three hours at 305° F. and 1550 p.s.i. The exact conditions may be varied depending upon the desired density and degree of cure for the shoe. The molded product removed from the mold is then subjected to a second or final cure involving prolonged heat cycling for ten hours at about 350° F. or upwards.

The graphite is preferably a natural graphite analyzing about 95% graphitic carbon. The source of cast iron particles is preferably white cast iron, but equivalent forms of cast iron can be used since these particles are responsible for a long wear characteristic of the shoe of the present invention in its preferred form.

As noted, the above example including naturally occurring graphite and iron particles of the white cast iron type is preferred, but I have found that the desired characteristic of low friction and absence of intolerable wet fade-out for a composition shoe can be achieved while varying the percentages of ingredients within the following ranges:

| Ingredient: | Percent by weight |
| --- | --- |
| Phenol formaldehyde (thermosetting phenolic resin) | 14–24 |
| Cast iron particles | 12–30 |
| Graphite particles (preferably natural graphite) | 20–55 |
| Asbestos fibers | 8–17 |
| Miscellaneous friction modifying mineral particles | 0–30 |

The present shoe is characterized by a binder entirely of phenol formaldehyde. The binder affords a matrix in which is distributed the remainder of the ingredients, namely, the fillers which include asbestos fibers, cast iron particles, natural graphite and miscellaneous mineral friction modifiers such as barytes, corundum, and powdered coke. This combination results in an acceptable shoe which displays a coefficient of friction that closely approximates that of the standard cast iron railroad brake shoe, namely, about 0.20 at about 60 m.p.h. and unexpectedly is in marked contrast to high friction composition railroad brake shoes ($f$=about 0.35 at about 60 m.p.h.) as heretofore available on a commercial scale wherein the binder or matrix includes a large percentage of an elastomer, specifically a thermoplastic ingredient in the form of rubber and in which there was no natural graphite approaching the large percentage of this ingredient in the present friction element, the minimum requirement which is at least 20% by weight under the present invention.

It will be seen that the composition of the present invention makes possible the realization of a relatively low coefficient of friction, approximately the same as that of a standard cast iron railroad brake shoe. Additionally, there is no unacceptable degree of so-called wet fade-out, that is, an unacceptable loss in friction when the shoe becomes wet in comparison to its frictional characteristics when dry, and it may be observed that this is one of the primary attributes of the standard cast iron railroad brake shoe. Because of these characteristics, the present composition shoe can be interchanged with a cast iron shoe without altering the brake equipment, and in particular the brake pressure; and because the standard, higher brake pressure for a cast iron shoe can be used, in contrast to low brake pressures required for the above-identified prior composition railroad brake shoes having a coefficient of friction of about 0.35, it can be expected that snow or ice accumulations on the present shoes will be readily removed in the course of a brake engagement. The magnitude of this difference in brake pressure can be realized by observing that dynamometer testing shows that about a fifty percent increase in brake pressure, up to almost precisely that used for the standard cast iron shoe, is required to produce a complete dynamometer stop under given wheel load, speed (60 m.p.h.) and stop distance limits equipped with the present shoe ($f$=about 0.20 at about 60 m.p.h. dynamometer) in comparison to dynamometer stopping accomplished under the same given limits with the above-identified prior art composition shoes.

Hence, while I have described a preferred embodiment of my invention, it is to be understood that this is capable of variation and modification.

I claim:

1. A composition railroad brake shoe having a dynamometer coefficient of friction of about 0.20 at about 60 m.p.h. and having a binder matrix consisting essentially of thermosetting phenolic resin, about 14 to 24 parts by weight and fillers distributed through said matrix and comprising the following in the parts by weight indicated:

| | |
| --- | --- |
| Cast iron particles | About 12–30 |
| Graphite particles | About 20–55 |
| Asbestos fibers | About 8–17 |

2. A shoe accordin gto claim 1 containing friction modifiers, up to about 30 parts by weight, selected from the group consisting of barytes, corundum, and powdered coke.

References Cited

UNITED STATES PATENTS

| | | | |
| --- | --- | --- | --- |
| 3,210,303 | 10/1965 | Biggs | 260—38 |
| 2,605,877 | 8/1952 | Winther | 260—38 |
| 2,252,991 | 8/1941 | Steck | 260—38 |

MORRIS LIEBMAN, Primary Examiner

L. T. JACOBS, Assistant Examiner